United States Patent [19]

Suzuki

[11] Patent Number: 4,559,524

[45] Date of Patent: Dec. 17, 1985

[54] ROTARY ENCODER

[75] Inventor: Masato Suzuki, Kawasaki, Japan

[73] Assignee: Sumtak Corporation, Tokyo, Japan

[21] Appl. No.: 505,466

[22] Filed: Jun. 17, 1983

[51] Int. Cl.[4] .......................... G08C 9/06; G01D 5/34
[52] U.S. Cl. ............................ 340/347 P; 250/231 SE
[58] Field of Search ............. 340/347 P; 250/231 SE,
250/231 R, 231 G; 356/152, 395

[56] References Cited

U.S. PATENT DOCUMENTS

| 3,242,478 | 3/1966 | Kaestner | 340/347 P |
| 4,064,504 | 12/1977 | Lepetit et al. | 340/347 P |
| 4,335,306 | 6/1982 | Gort et al. | 250/231 SE |
| 4,475,034 | 10/1984 | Maddox et al. | 250/231 SE |

Primary Examiner—Vit W. Miska

Attorney, Agent, or Firm—Oblon, Fisher, Spivak, McClelland & Maier

[57] ABSTRACT

A rotary encoder for measuring a rotary angle and the number of rotation, which consists principally of a rotary shaft, a rotary slit disk fitted to the rotary shaft and a light emitting element and detectors opposing each other while interposing the rotary slit disk between them and fixed to a part of a housing in the non-contact arrangement with respect to the rotary slit disk. The present invention is characterized in that the rotary encoder is equipped with at least two pairs of detectors, each consisting of two detectors, and each detector pair is arranged in such a fashion that the resultant value of the detecting signals of the detectors forming each pair can be regarded as being detected at one point of resultant center which is substantially predetermined on the rotary slit disk.

4 Claims, 22 Drawing Figures

ROTARY ENCODER

BACKGROUND OF THE INVENTION

This invention relates to a rotary encoder for measuring the rotary angle and number of rotation of a rotary shaft. More particularly, the present invention relates to the construction of detectors of the rotary encoder.

The rotary encoder (which hereby denotes an optical incremental rotary encoder) generates pulse trains proportional to the rotary angle when an input rotary shaft is rotated. The rotary encoder consists principally of a rotary shaft, a rotary slit disk fitted to the rotary shaft and a light emitting element and detectors opposing each other while interposing the rotary slit disk between them and fixed to a part of a housing in the noncontactive arrangement with respect to the rotary slit disk. The rotary slit disk is equipped with slits or dark and bright portions over its entire circumference as depicted in FIG. 1. The fixed detectors disposed in the proximity of the rotary slit disk detect changes in the light quantity passing through the rotary slit disk and the rotary encoder provides a signal in accordance with the rotation of the rotary shaft. At least two detectors must be disposed in order to distinguish the directions of rotation. Hence, the two detectors are disposed at different positions of the rotary slit disk, and two output pulses A and B whose phases are deviated by 90° in terms of electric angle, as shown in FIG. 2, are obtained from the detecting signals of the respective detectors.

FIG. 3 typically shows a circuit construction to obtain the output pulses from the detecting signals. Each channel A, B has the same circuit construction. The signal, which is like a sine wave and is detected by each detector, is amplified by an amplification circuit to a predetermined amplitude and after waveform shaping by a comparison circuit, the output pulse A, B can be obtained.

FIG. 4 shows the conventional two methods of disposing the detectors. FIG. 4A shows the arrangement in which the detectors a, b are arranged in the radial direction of the rotary slit disk 1 while FIG. 4B shows the arrangement in which the detectors a, b are arranged in the circumferential direction. In order to provide a phase difference of 90° in terms of electric angle, the two detectors a, b are fitted in practice at the positions relatively deviated by ¼ with respect to one period of the slit, as shown in FIGS. 5A and 5B. These drawings are schematic enlarged views and since the number of slits of the rotary slit disk is practically about 1,000, the deviation quantity corresponding to the ¼ period described above is an extremely small value. In addition, since the signal from only one position of the slit is not sufficiently strong, a mask M such as shown in FIG. 6 is disposed in front of each detector in order to obtain signals of the same phase from a large number of adjacent slits and thus to improve the detection sensitivity.

In the conventional rotary encoder of the kind described above, the two detectors must be disposed at the mutually different positions. For this reason, a phase error is likely to occur if fitting of the rotary slit disk to the rotary shaft is not complete and eccentricity exists. The phase error also occurs if there is an error in the set position of each detector.

FIG. 7 schematically illustrates the cause for the occurrence of the phase error when eccentricity exists in the rotary slit disk 1. FIG. 7A shows the case in which the detectors a, b are disposed in the radial direction in the same way as in FIG. 4A and FIG. 7B shows the case in which they are disposed in the circumferential direction in the same way as in FIG. 4B. In the drawings, symbol O represents the center of rotation of the rotary slit disk 1, O' is the center of the rotary slit disk, $\epsilon$ is an eccentric value and $R_1$, $R_2$, $R$, $\phi_{e1}$, $\phi_o$, and $\phi_d$ represent the dimension and angles shown in the drawing. (Hereinafter, the unit angle will be [rad].) In FIG. 7A, the maximum value $\phi_{p1}$ of the phase error expressed in terms of electric angle is given by the following formula using the geometric phase error angle $\phi_{e1}$ with N representing the number of slits of the rotary slit disk 1:

$$\phi_{p1} = N \cdot \phi_{e1} \qquad (1)$$

From the geometric relation, since $\phi_{e1}$ is given by the following formula:

$$\phi_{e1} = \frac{R_1 - R_2}{R_1 \cdot R_2} \cdot \epsilon \qquad (2)$$

$\phi_{p1}$ can be obtained by the following formula:

$$\phi_{p1} = \frac{R_1 - R_2}{R_1 \cdot R_2} \cdot \epsilon \cdot N \qquad (3)$$

On the other hand, in the arrangement shown in FIG. 7B, the geometric phase error angle $\phi_{e2}$ is given by the formula:

$$\phi_{e2} = \phi_d - \phi_o \qquad (4)$$

The maximum value $\phi_{p2}$ of the phase error in terms of electric angle is given by:

$$\phi_{p2} = N \cdot \phi_{e2} = \frac{\epsilon \cdot \phi_o \cdot N}{R} \qquad (5)$$

Incidentally, FIGS. 7A and 7B show the arrangement in which the phase error becomes maximum but when the center of the rotary slit disk moves to O'' in the drawings, too, the phase error occurs in the quantity expressed by the formulas above but with the opposite polarity.

FIG. 8A shows the waveform when the waveform is observed by an oscilloscope or the like using one A of the output signals as the reference. In this case, the signal B exhibits irregularity of waveform which changes with a width $\pm \phi_p$ (the maximum values $\phi_{p1}$, $\phi_{p2}$ of the phase error) with its center located at the point where the phase becomes 90°. FIG. 9 shows the waveform when the set positions of the detectors deviate from each other (with the proviso that the rotary slit disk is free from eccentricity). A phase deviation $\phi$ corresponding to the deviation quantity of the mutual set positions of the detectors delivering the two signals A and B appears constantly. When both eccentricity and error of set positions co-exist, therefore, the irregularity of waveform and the phase deviation are synthesized and appear simultaneously.

If the irregularity of waveform and the phase deviation described above occur, the accuracy of the detecting signals drops and in an extreme case, the pulse interval becomes so narrow that the response speed of a signal processing circuit at a posterior stage can not follow up the pulses and miscounting would occur. If a signal C is generated by utilizing the state change points of the two signals A, B as shown in FIG. 10 and count is effected at a division rate four times the nominal value, the pulse interval of the resulting signal becomes further smaller so that the adverse influence exterted by the phase error becomes all the more critical.

FIG. 11 shows the signal when count is effected at the division rate of four times as described above when the irregularity of waveform exists. Since the pulse interval between the signals A and B drastically changes, the pulse gap of the signal C synthesized from these two signals A, B is not constant and if an extremely narrow portion locally exists, a controller receiving the output of the rotary encoder as its input signal can not respond to the signal.

The problem described above primarily results from the eccentricity of the rotary slit disk and the error of set positions of the detectors during assembly of the rotary encoder. This problem has been solved conventionally only by adjustment and the time and labor necessary for this adjustment is tremendous. If an amateur without high skill of the rotary encoder assembles a kit encoder, he can never make a high level of adjustment and the signal accuracy unavoidably drops.

SUMMARY OF THE INVENTION

The present invention is directed to eliminate the drawbacks of the prior art described in the foregoing.

It is a principal object of the present invention to provide a rotary encoder which does not generate a phase error even if the eccentricity of a rotary slit disk and the error of set positions of detectors exist during assembly of the rotary encoder, and which has a high level of accuracy.

It is another object of the present invention to provide a rotary encoder which can reduce the number of production steps.

These and other object of the present invention will become more apparent from the following detailed description thereof.

In a rotary encoder for detecting the rotating direction and the number of rotation from the sequence of the phases of detecting signals and from the frequency, which includes a rotary shaft, a rotary slit disk fitted to the rotary shaft and equipped with a large number of slits disposed equiangularly over the entire circumference and a light emitting element and detectors opposing each other while interposing the rotary slit disk between them and fixed to a part of a housing in the non-contact arrangement with respect to the rotary slit disk, and in which the change in a light quantity in accordance with the rotation of the rotary slit disk is detected by at least two pairs of fixed detectors, the rotary encoder in accordance with the present invention is characterized in that two of the detectors form one pair and the detectors are arranged in such an arrangement of gaps that the resultant value of the detecting signals of the detectors forming each pair can be regarded as being detected substantially at a predetermined one point of resultant center for all of the pairs of detectors.

DESCRIPTION OF THE PREFERRED EMBODIMENTS

Figure 2:
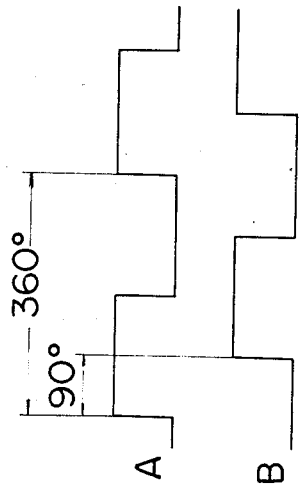
FIG. 2 is a waveform chart of an output signal.
Figure 1:
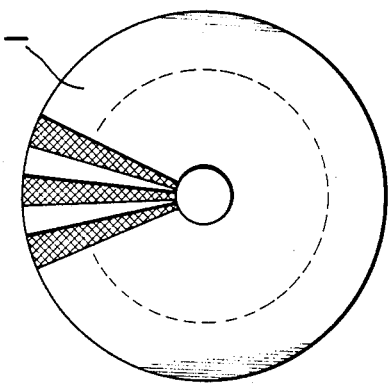
FIG. 1 is a front view of a rotary slit disk.
Figure 3:
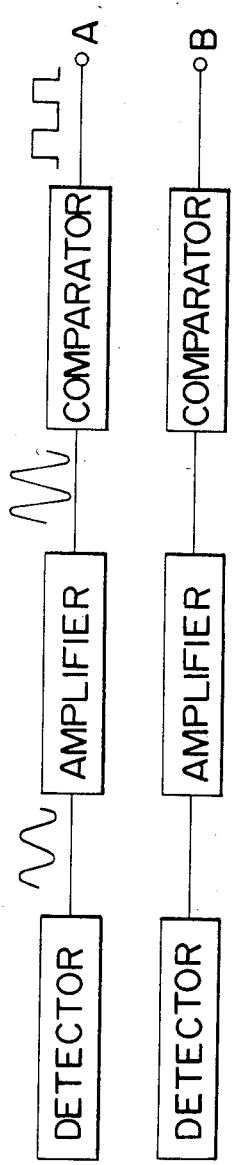
FIG. 3 is a block diagram of the conventional circuit construction.
Figure 4A:
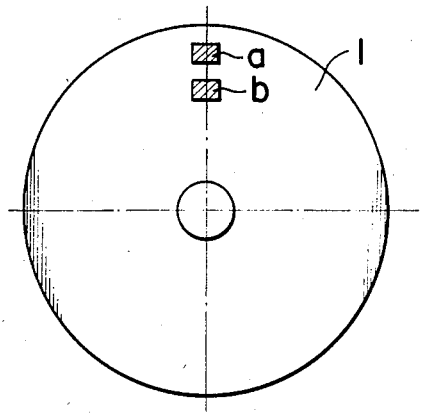
FIGS. 4A and 4B are diagrams showing the conventional arrangement of a photodetector.
Figure 4B:
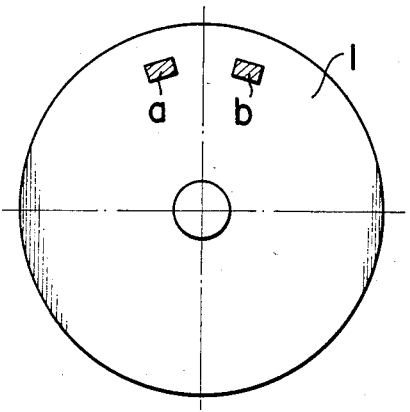
Figure 5A:
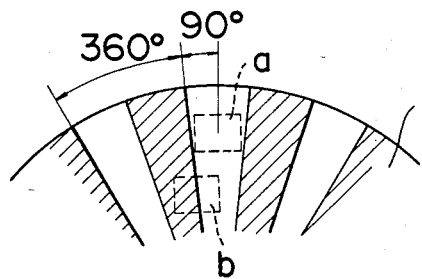
FIGS. 5A and 5B are partial enlarged views of FIGS. 4A and 4B, respectively.
Figure 5B:
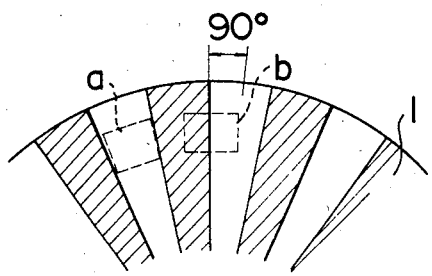
Figure 6:
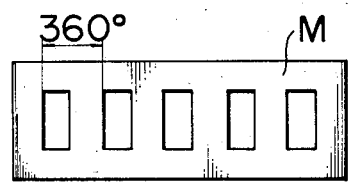
FIG. 6 is a plan view of a mask in actual use.
Figure 7A:
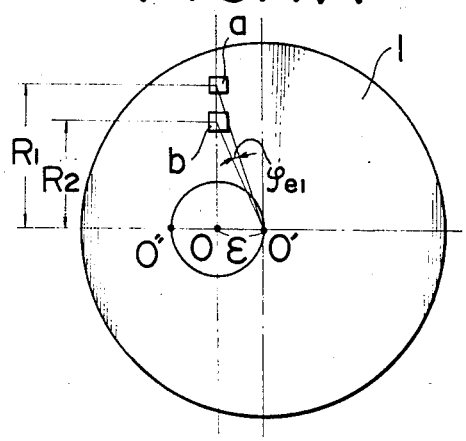
FIGS. 7A and 7B are schematic views useful for deriving the relational formulas in the prior art, respectively.
Figure 7B:
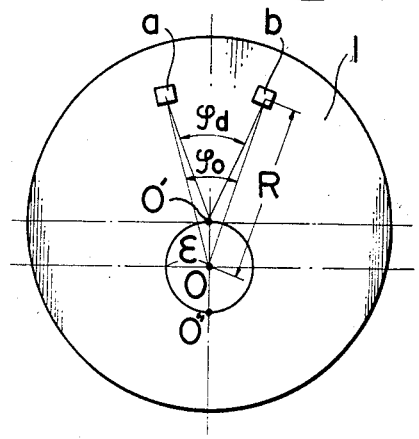
Figure 8:
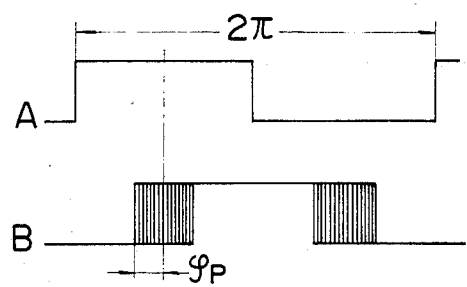
FIGS. 8 through 11 are waveform charts useful for explaining the operation.
Figure 9:
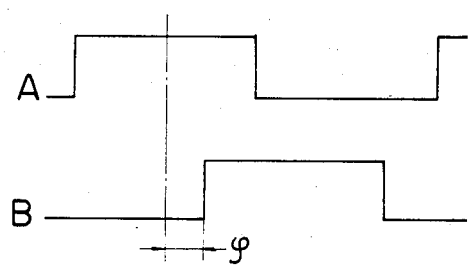
Figure 10:
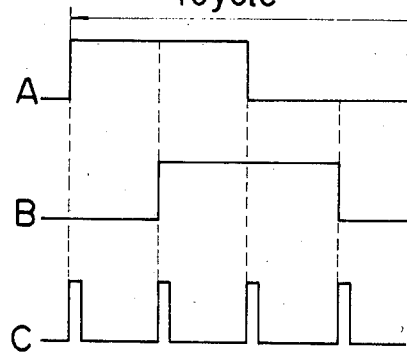
Figure 11:
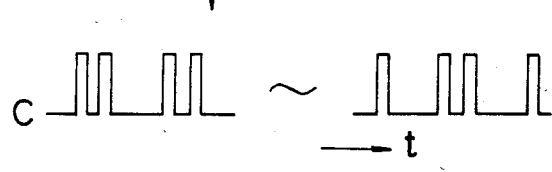
Figure 12:
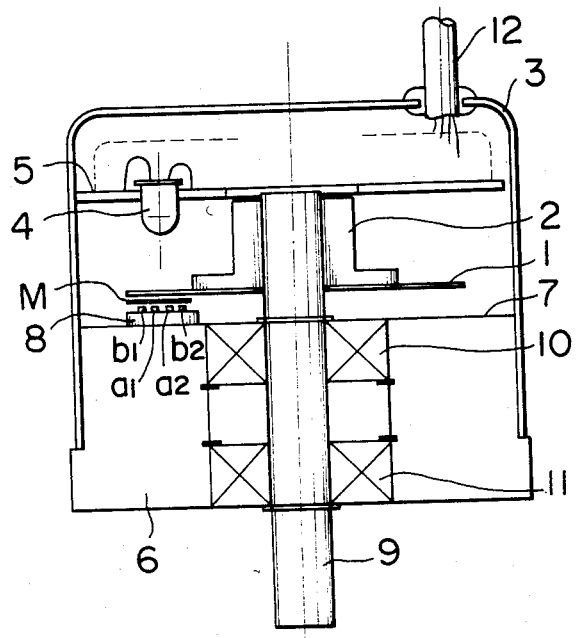
FIG. 12 is a sectional view of a rotary encoder in accordance with the present invention.

The rotary encoder in accordance with the present invention has the construction shown in FIG. 12, which is a sectional view of the rotary encoder in accordance with one embodiment of the invention.

In the drawing, reference numeral 3 represents a case, in which a printed plate 5 having a light emitting element (light emitting diode, LED) 4 fitted thereto is fixed. Reference numeral 6 represents a body which fits to the case 3. A fixed printed plate 7 is disposed at one end of this body 6 and four detectors $a_1$, $a_2$, $b_1$, $b_2$ (two detectors forming one pair) are fixed onto this printed plate via a detector support 8. A mask M is fixed to the fixed printed plate 7 above these detectors via supports (not shown). Reference numeral 1 represents the rotary slit disk and a boss 2 is fixed to the center of the rotary slit disk 1. The boss 2 is fitted to a rotary shaft 9 so as to rotate together with the shaft 9. Reference numerals 10 and 11 represent bearings for supporting the rotary shaft 9 and reference numeral 12 represents a cable which is electrically connected to the light emitting element 4 and the detectors $a_1$, $a_2$, $b_1$, $b_2$. (The connecting state is not shown in the drawing.)

Figure 13:
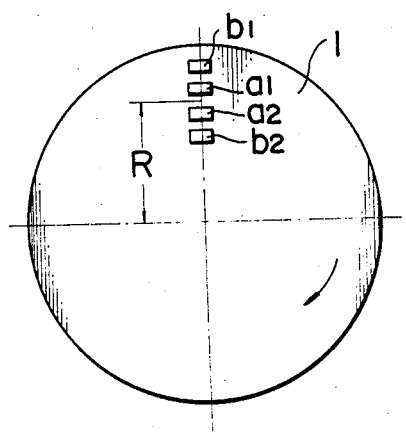
FIG. 13 is a diagram showing the arrangement of the rotary slit disk and the photodetector in the present invention.
Figure 14:
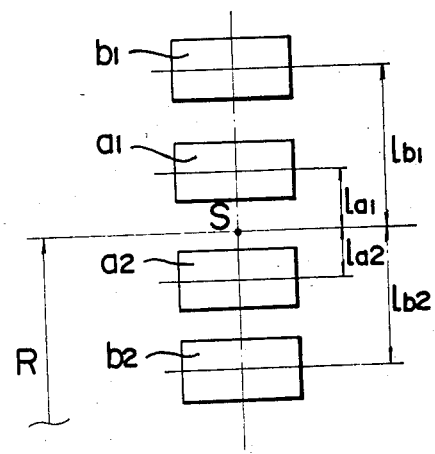
FIG. 14 is a partial enlarged view of FIG. 13.
Figure 15A:
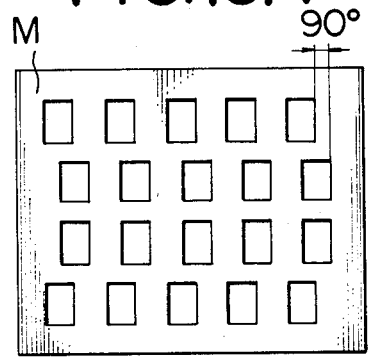
FIG. 15 is a plan view of the mask in actual use and FIG. 15B a plan view of the photodetector.
Figure 15B:
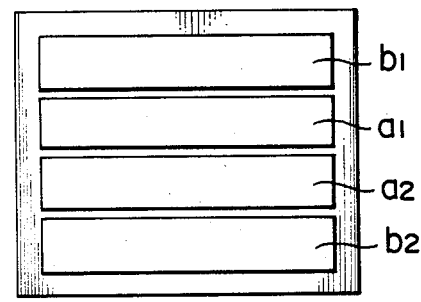

FIG. 13 shows the principal construction of the present invention and is structurally characterized in that the four detectors $a_1$, $a_2$, $b_1$, $b_2$ are disposed with desired gaps between them in the radial direction of the rotary slit disk 1. FIG. 14 illustrates in detail the detectors $a_1$, $a_2$, $b_1$, $b_2$. Each detector is disposed at a vertical position with a gap $l_{a1}$, $l_{a2}$, $l_{b1}$, $l_{b2}$ from the center S of the group of detectors as shown in the drawing. (The gap is given by the later-appearing formula.) A mask such as shown in FIG. 15A is put on the detectors and the detectors arranged in the manner shown in FIG. 15B are put on the mask in order to obtain a signal whose phase is different by 90° and which is strong.

Figure 16:
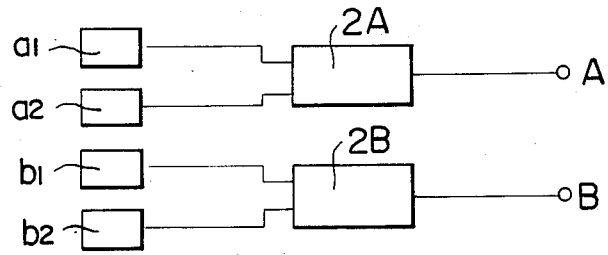
FIG. 16 is a block diagram of an electric circuit.

FIG. 16 shows the circuit construction for obtaining output pulses A and B from the signals of the detectors. The output signal A is synthesized from the detectors $a_1$, $a_2$ by a synthetic circuit 2A and the output signal B is synthesized from the detectors $b_1$, $b_2$ by a synthetic circuit 2B. In other words, the present invention utilizes the property that when two alternating signals having the same amplitude are synthesized (to obtain the sum or difference), a signal can be obtained which has the mean phase of these two signals. The arrangement and gaps between the detectors $a_1$, $a_2$, $b_1$, $b_2$ are determined in such a fashion that the signal obtained by synthesizing the signals from the detectors $a_1$, $a_2$ and the signal obtained by synthesizing the signals from the detectors $b_1$, $b_2$ can be regarded as being detected substantially at the center S of the detector group and thus the phase difference can be eliminated. In other words, the distance $R_1$, $R_2$ of the detectors in the aforementioned equation (3) representing the maximal value of the phase difference due to eccentricity are made substantially equal to each other and the numerator in equation (3) is made zero so as to reduce the phase difference. Additionally, the signal synthesis can also be accomplished by obtaining the sum of the signals for each detector pair $a_1$, $a_2$, $b_1$, $b_2$, but if a method of obtaining the difference of two signals is employed, then it is necessary to shift the slit of one of the masks of the pairs shown in FIG. 15A so as to be deviated by 180° in terms of electric angle from that shown in the drawing, the optical bias quantity superposed with the detection signal can be offset and a stable signal can be obtained in consequence.

The gap $l_{a1}$, $l_{a2}$, $l_{b1}$, $l_{b2}$ providing the arrangement of the detectors will be derived by the geometric observation.

Figure 17:
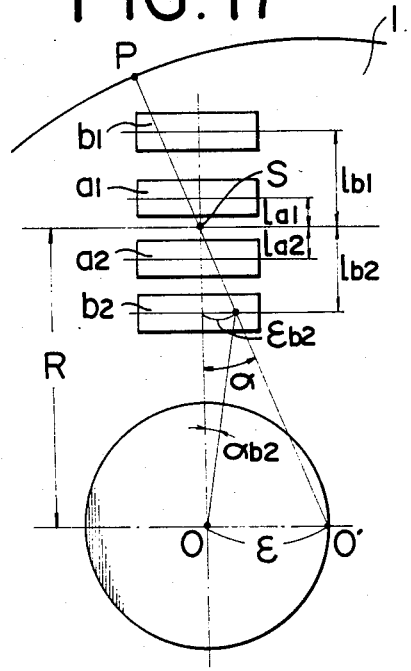
FIG. 17 is a schematic view for deriving the relational formula.

FIG. 17 shows the relation of disposition between the rotary slit disk 1 which is eccentrically fitted and the detector groups. Symbol $\epsilon$ represents the eccentric value, O is the center of rotation of the rotary slit disk 1, O′ is the center of the rotary slit disk and R is the gap between the center of rotation O and the center S of the detector groups. A line O′P is the same phase line (hereinafter referred to as an "information line") of the slit passing through the point S and $\alpha$ is the angle between the information line O′P and the line OS.

First, the detector $b_2$ will be picked up. The deviated value $\epsilon_{b2}$ from the information line O′P is given by:

$$\epsilon_{b2} \approx l_{b2} \cdot \alpha \tag{6}$$

and the angle $\alpha$ is given by:

$$\alpha \approx \epsilon/R \tag{7}$$

The formula (7) is put into the formula (6) to provide the formula:

$$\epsilon_{b2} = l_{b2} \cdot (\epsilon/R) \tag{8}$$

On the other hand, the angle $\alpha_{b2}$ with respect to the deviated value $\epsilon_{b2}$ from the center of rotation O is given by:

$$\alpha_{b2} \approx \epsilon_{b2}/(R - l_{b2}) \tag{9}$$

The formula (8) is put into this formula to provide the following formula:

$$\alpha_{b2} = (l_{b2} \cdot \epsilon)/R(R - l_{b2}) \tag{10}$$

The proportion of this angle in one period of the electric signal, that is, the electric angle $\phi_{b2}$ is given by the following equation with N representing the number of slits of the rotary slit disc 1:

$$\phi_{b2} = \alpha_{b2} \cdot N = (l_{b2} \cdot \epsilon \cdot N)/R(R - l_{b2}) \tag{11}$$

The electric angles $\phi_{b1}$, $\phi_{a1}$, $\phi_{a2}$ for the other detectors $b_1$, $a_1$, $a_2$ can be determined by the following equation by following the same procedures as described above:

$$\phi_{b1} = l_{b1} \cdot \epsilon \cdot N/R(R + l_{b1}) \tag{12}$$

$$\phi_{a1} = l_{a1} \cdot \epsilon \cdot N/R(R + l_{a1}) \tag{13}$$

$$\phi_{a2} = l_{a2} \cdot \epsilon \cdot N/R(R - l_{a2}) \tag{14}$$

In order to accomplish the intended object of "phase error=0", an arrangement should be made so that the resultant signals obtained by the two detector pairs $a_1$, $a_2$ and $b_1$, $b_2$ can be regarded as being detected at the point S; hence, the following relation must be satisfied:

$$\phi_{a1} = \phi_{a2} \tag{15}$$

$$\phi_{b1} = \phi_{b2} \tag{16}$$

The relation between $l_{a1}$ and $l_{a2}$ is determined as follows from these formulas:

$$l_{a1} = \frac{1}{\frac{1}{l_{a2}} - \frac{2}{R}} \tag{17}$$

Similarly, the following relational formula can be obtained between $l_{b1}$ and $l_{b2}$:

$$l_{b1} = \frac{1}{\frac{1}{l_{b2}} - \frac{2}{R}} \tag{18}$$

The occurrence of the phase error due to the eccentricity of the rotary slit disk can be thus prevented by arranging the detectors at the positions satisfying the formulas described above and synthesizing the signals by the respective pairs. The phase error does not occur even when the detector groups are inclined with the point S as the center, because their influences offset with each other. Although the embodiment that has been described deals with the case in which two pairs of detectors are disposed (two channels), the similar effect can of course be obtained in the same way in the case of multiple channels. Furthermore, the present invention can be applied to a linear encoder by making R infinite ($R \to \infty$).

Figure 18:
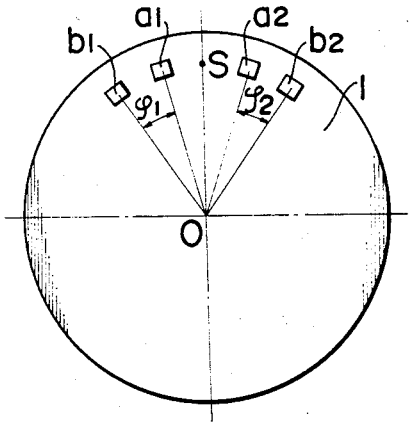
FIG. 18 shows another embodiment of the present invention.

FIG. 18 shows another embodiment of the present invention adapted to a rotary encoder of the type in which the detectors are aligned in the circumferential direction. The condition of arrangement in this case is given by $$\phi_1 = \phi_2 \tag{19}$$

using the angles $\phi_1$, $\phi_2$ shown in the drawing. In this case, since the detection point for obtaining the two signals having the mutually different phases can be regarded as existing extremely close to the point S, $\phi_o$ in the formula (5) becomes zero and the phase error can be made extremely small.

What is claimed is:

1. A rotary encoder comprising:
 a rotary shaft;
 a rotary slit disk affixed to said rotary shaft and having a plurality of slits disposed equiangularly over the entire circumference of the surface of said rotary slit disk;
a light emitting means;
a plurality of paired detectors in which each individual detector comprises:
a photodetector opposing said light emitting means with said rotary slit disk interposed between said photodetectors and said light emitting means;
means for coupling together the individual detectors into detector pairs and for outputting resultant pulses which have the mean phase of the combined output pulses of each of the individual pulses of the individual detectors in each of the paired detectors such that resultant outputting pulses can be regarded as being substantially at a predetermined one point of the resultant center of all of said detector pairs.

2. The rotary encoder as defined in claim 1 wherein each of said detector pairs is formed by disposing linearly two detectors in the radial direction of said rotary slit disk, the first detector pairs consists of a detector disposed at a point spaced apart by a distance $l_{a1}$ from the center of said detector pair, which is disposed at a point spaced apart by a distance R from the center of rotation of said rotary slit disk, in the outer direction of said rotary slit disk and another detector disposed at a point spaced apart by a distance $l_{a2}$ from the center of said detector pair in the central direction of said rotary slit disk, the second detector pairs consists of a detector disposed at a position spaced apart by a distance $l_{b1}$ from the center of said detector pair in the outer direction of said rotary slit disk and another detector disposed at a point spaced apart by a distance $l_{b2}$ from the center of said detector pair in the central direction of said rotary slit disk, and each of said distances satisfies the following relation:

$$l_{a1} = \frac{1}{\frac{1}{l_{a2}} - \frac{2}{R}}, \quad l_{b1} = \frac{1}{\frac{1}{l_{b2}} - \frac{2}{R}}.$$

3. The rotary encoder as defined in claim 1 wherein said detector pairs are formed by disposing two pairs of detectors in the arcuate form in the circumferential direction of said rotary slit disk and said detectors of each of said detector pairs are disposed symmetrically with respect to a line connecting the center of said detector pairs and the center of said rotary slit disk.

4. The rotary encoder as defined in claim 1, 2 or 3 wherein a mask having a plurality of slits corresponding to the slit gaps of said rotary slit disk is disposed in front of each of said detectors.

* * * * *